US008464040B2

(12) United States Patent (10) Patent No.: US 8,464,040 B2
Ransom (45) Date of Patent: Jun. 11, 2013

(54) SYSTEMS AND METHODS TO CONTROL MULTIPLE PERIPHERALS WITH A SINGLE-PERIPHERAL APPLICATION CODE

(75) Inventor: Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 561 days.

(21) Appl. No.: 12/769,462

(22) Filed: Apr. 28, 2010

(65) Prior Publication Data

US 2011/0271086 A1 Nov. 3, 2011

(51) Int. Cl.
   *G06F 15/177* (2006.01)
(52) U.S. Cl.
   USPC .................................................. 713/2; 710/8
(58) Field of Classification Search
   USPC .................................................. 710/8; 713/2
   See application file for complete search history.

(56) References Cited

U.S. PATENT DOCUMENTS 6,446,139 B1 * 9/2002 Leung et al. ...................... 710/1
7,310,724 B2 * 12/2007 Chen et al. ....................... 713/1

* cited by examiner

*Primary Examiner* — Albert Wang
(74) *Attorney, Agent, or Firm* — Ingrassia Fisher & Lorenz, P.C.

(57) ABSTRACT

Methods and apparatus are provided for enhancing the BIOS of a hardware peripheral device to manage multiple peripheral devices simultaneously without modifying the application software of the peripheral device. The apparatus comprises a logic control unit and a memory in communication with the logic control unit. The memory is partitioned into a plurality of ranges, each range comprising one or more blocks of memory, one range being associated with each instance of the peripheral application and one range being reserved for storage of a data pointer related to each peripheral application of the plurality. The logic control unit is configured to operate multiple instances of the control application by duplicating one instance of the peripheral application for each peripheral device of the plurality and partitioning a memory device into partitions comprising one or more blocks of memory, one partition being associated with each instance of the peripheral application. The method then reserves a range of memory addresses for storage of a data pointer related to each peripheral device of the plurality, and initializes each of the plurality of peripheral devices.

20 Claims, 5 Drawing Sheets

-PRIOR ART-

Fig. 1

-PRIOR ART-

-PRIOR ART-

SYSTEMS AND METHODS TO CONTROL MULTIPLE PERIPHERALS WITH A SINGLE-PERIPHERAL APPLICATION CODE

STATEMENT REGARDING FEDERALLY SPONSORED RESEARCH OR DEVELOPMENT

This invention was made with Government support under Agreement number DE-FC26-07NT43123, awarded by the US-Department of Energy. The Government has certain rights in this invention.

TECHNICAL FIELD

The present invention generally relates to hardware control applications and more specifically to enhancing the BIOS of a controlled hardware peripheral to manage multiple peripheral devices.

BACKGROUND OF THE INVENTION

Industry has invested billions of dollars in developing control system software for a plethora of computer controlled peripheral devices in order to enhance economic productivity. Often, the software is developed to control a single peripheral device. This is particularly so for unique or limited purpose peripheral devices.

In order to control multiple devices, costly modifications to the application software control code are necessary to adapt the software to circumstances requiring the control and coordination of multiple peripheral devices. For example, every parameter and every variable in the control code related to each peripheral would have to be duplicated for each peripheral on a case-by-case basis. It may take weeks to duplicate one variable for each peripheral device and may take years to locate and reconfigure referential commands for each one.

Further, much of the application control code resulted from endless experimentation and empirical data collection over a span of years by artisans that may no longer be available. Once good control code is working properly, modifying it is a dreaded option.

Conventionally, either the application software itself must undergo custom modification, the jump table included with the application software is expanded, or both. In any case, additional cost and complex operational issues result. A jump table is either an array of pointers that point to executable functions or point to an array of machine code jump instructions. If one is dealing with a relatively static set of functions (such as system calls or virtual functions for a class) then this table may be created once. Functions may then be called using a simple index into the array. This may require retrieving the pointer and calling a function or may require jumping to the machine code depending on the type of table used. In the context of controlling a hardware peripheral, the jump is often made to a function in the basic input/output system (BIOS) of the peripheral.

Rewriting a software application to handle multiple peripheral devices is costly. Further, modifying a BIOS or BIOS interface to handle multiple peripheral devices has disadvantages such as data collisions, sharing issues between I/O resources, or requiring the strict structuring of the various BIOSs to operate in lock step. Each of these issues results in a reduction of performance speed or increased cost.

Accordingly, it is desirable to expand the flexibility of existing peripheral applications economically. In addition, it is desirable to simplify the interface between multiple peripheral devices and to streamline its operation. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for configuring a processor to operate a plurality of peripheral devices without altering a peripheral application designed to drive one peripheral device. The method includes duplicating one instance of the peripheral application and an associated BIOS for each peripheral device of the plurality and partitioning a memory device into partitions comprising one or more blocks of memory, one partition being associated with each instance of the peripheral application and its associated BIOS. Each block of memory comprises an entry point address for a BIOS function associated with one peripheral device of the plurality. The method also includes reserving a range of memory addresses for storage of a data pointer related to each peripheral device of the plurality, the data pointers being configured for use during context switching between the plurality of peripheral devices and then initializing each of the plurality of peripheral devices.

A logic device is provided for concurrently executing a plurality of instances of a peripheral application. The logic device includes a logic control unit and a memory in communication with the logic control unit, wherein the memory is partitioned into a plurality of ranges. Each range comprises one or more blocks of memory. One range is associated with each instance of the peripheral application and an associated BIOS and one range is reserved for storage of data pointers related to each peripheral application of the plurality of instances of the peripheral application.

A computer readable storage medium is provided that stores instructions that when executed by a computing device duplicate one instance of a peripheral application and a BIOS for each peripheral device of a plurality of peripherals and partitions a memory device into partitions comprising one or more blocks of memory. One partition is associated with each instance of the peripheral application. Each block of memory comprises an entry point address for a BIOS function associated with one peripheral device of the plurality. The instructions alter one BIOS to be a master BIOS. This is done by creating a dummy code in the master BIOS, the dummy code being configured to generate known entry point addresses in non-master BIOS blocks. The instructions also reserve a range of memory addresses for storage of a data pointer related to each peripheral device of the plurality. The data pointer is configured for use during context switching between the plurality of peripheral devices. The instructions then initialize each of the plurality of peripheral devices.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
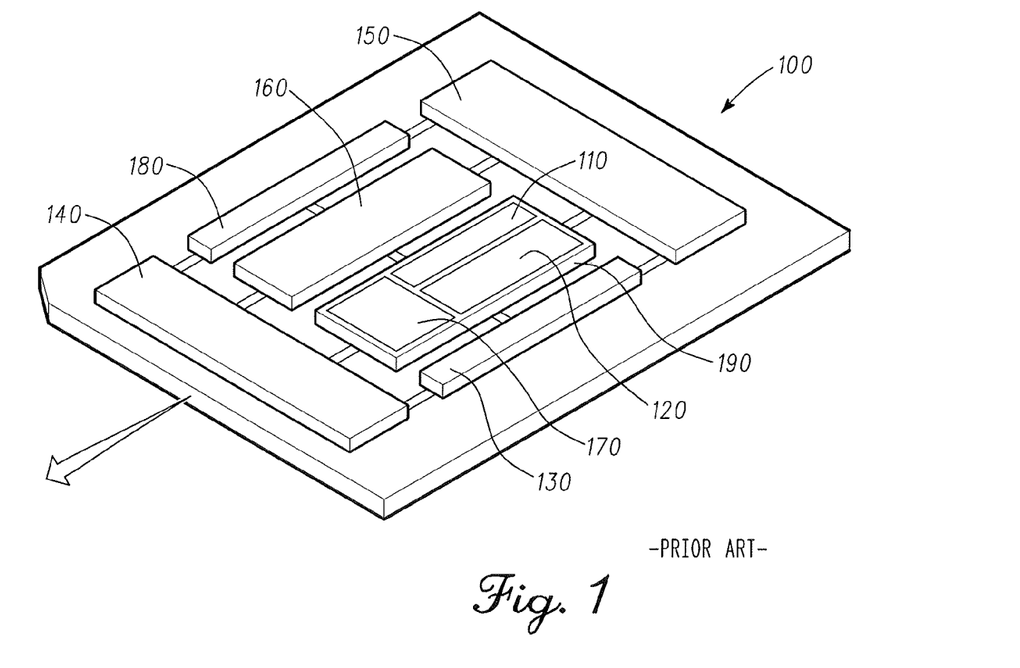
FIG. 1 is a block diagram of an exemplary processor.

FIG. 1 is a functional block diagram of an exemplary processor 100 that may be used to execute a peripheral software program and the BIOS associated with the hardware peripheral. In practice, the processor may be any suitably configured processor known in the art or that may be developed in the future. Non-limiting, examples of a processor may include a central processing unit, a special purpose processor, a general purpose processor, a co-processor, a data signal processor, and a programmable logic device such as a field programmable field array. A specific non-limiting example of a processor is a Power PC processor from Freescale Semiconductor of Phoenix, Ariz.

The exemplary processor 100 includes a logic control unit 160, an instruction unit 190, and input-output management unit 140, a memory for instructions 180, a data memory 130, and an auxiliary memory 150. The instruction unit 190 may include an arithmetic logic unit (ALU) 110 that performs arithmetic and logical operations, a floating point unit (FPU) 120 designed to carry out operations on floating point numbers, and a memory cache 170.

A memory cache is a small amount of memory whose contents can be accessed more quickly than memory available elsewhere such as auxiliary memory 150 or data memory 130. Typically, this specialized storage is not considered part of the normal memory range for the processor 100. Most, but not all, modern computers adopt the so-called load-store architecture. Under this paradigm data is transferred from a subordinated memory (e.g. auxiliary memory 150) into one or more registers, the data is processed therein by running instructions from the instruction memory 180. The data is then transferred elsewhere via I/O management Unit 140.

The construction and the function of a specific processor of any given variety is well known in the art. Therefore, a detailed description of the operation of processor 100 and its component parts is being omitted in the interest of brevity and clarity.

Although the peripheral control software is discussed herein as being resident in the processor 100, one of ordinary skill in the art will recognize the peripheral control software 110 and/or any component there of may reside on any computer readable storage medium in communication with the processor 100. One of ordinary skill in the art will recognize that a computer readable storage medium may be any device capable of storing electronic data without departing from the intended scope of the disclosure herein. Non-limiting examples of a computer readable storage medium include processor, an electronic memory device, a magnetic disk, and optical disk and the like.

Figure 2A:
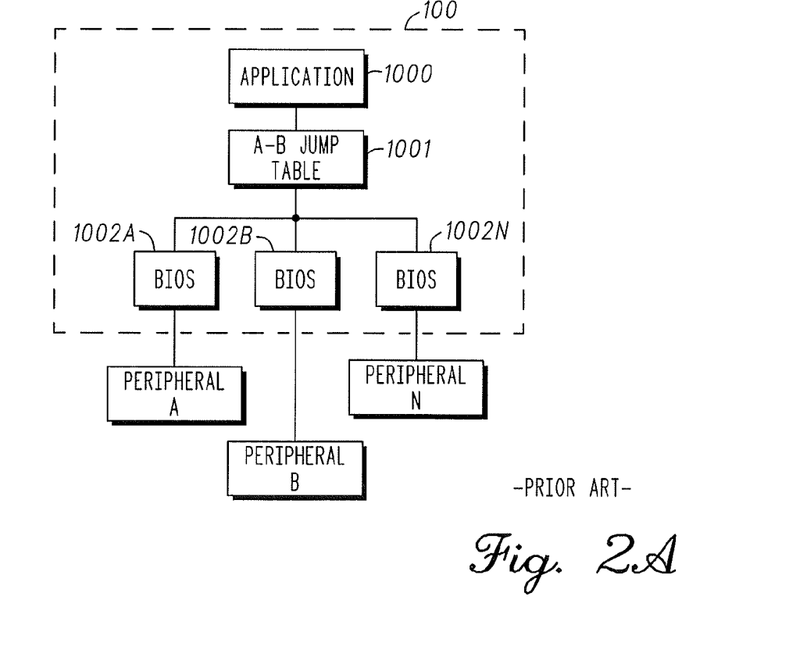
FIG. 2A is a functional block diagram of a conventional peripheral application and its BIOS control architecture.

FIG. 2A is a prior art functional block diagram of peripheral application software 1000 executing on the processor 100 that is modified to control multiple peripherals as may be conventionally practiced in the art. In this simplified example, a single instance of a hardware peripheral application 1000 is executing on processor 100 and is controlling multiple peripherals (A, B, N).

The single peripheral application 1000 communicates with the peripheral (A) via an associated BIOS 1002 (A). The peripheral application 1000A and the BIOS 1002A are loaded into the processor 100 by commands stored in an executable code called a bootloader that is resident in read-only memory (ROM) (not shown). The bootloader may typically be found in a low memory address such as 0x4000, for example.

At boot time the bootloader code searches blocks of ROM code for a signature at the base of a block that tells the processor that a particular block contains executable code and that each block exists and is intact. If all memory blocks are found to be satisfactory, the bootloader passes control to a peripheral (A) start-up code, which begins the initialization for the peripheral as will be described in more detail below concerning prior art processes 400 of FIG. 4A.

After initialization, to send information to, or to retrieve information from the peripheral (A), the peripheral application 1000 calls the associated BIOS 1002 A-N. The BIOS then reads information from or writes information to the hardware peripheral (A-N). One of ordinary skill in the art will appreciate that a single instance of the peripheral application 1000 written to control a single hardware peripheral (e.g. hardware peripheral A), would necessarily have to be rewritten to expand the capability of every function and subroutine within the single peripheral application 1000 to handle multiple peripherals.

Figure 2B:
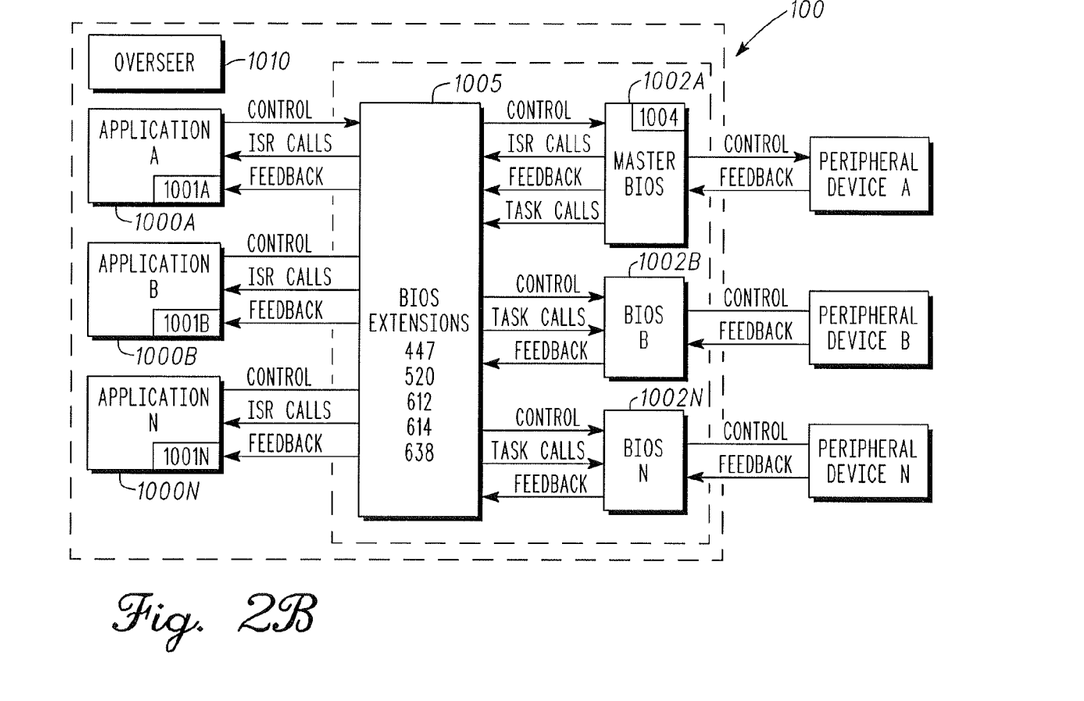
FIG. 2B is a functional block diagram of a peripheral and an exemplary BIOS control architecture.

FIG. 2B is a functional block diagram of an alternative software architecture according to embodiments disclosed herein that operates multiple peripherals. The peripheral application 1000 may be resident in a ROM, from which multiple identical instances of the peripheral application 1000 A-N may be generated. If not, then during boot up, the processor 100 may load and initialize multiple, identical instances of the peripheral application (1000A-N) from a non-volatile memory location. Each instance of the peripheral application 1000 A-N may include its own jump table (1001A-N).

Each instance of the peripheral application 1000 A-N is an unmodified instance and is associated with only one of the installed hardware peripherals (A-N). By loading multiple instances of the peripheral application 1000, there is no cost incurred to modify the peripheral application 1000 and no problematic complexities created in modifying one jump table to communicate with multiple associated peripheral BIOSs 1002 A-N. For every instance of a peripheral application 1000 A-N that is created, its associated BIOS 1002 A-N is also created which communicates with its associated peripheral device (A-N).

Further, one BIOS of the plurality of BIOSs 1002 A-N may be modified to include some BIOS extensions 1005 to create a master BIOS as will be further described below in regard to FIGS. 4B, 5 and 6, below. The BIOS extensions 1005 are additional BIOS commands that allow control commands being forwarded to the peripheral devices A-N and feedback being returned from the peripheral devices A-N to pass through transparently. However, interrupt service routine calls and task calls generated by the master BIOS may be intercepted by the BIOS extensions 1005 and routed to the proper BIOS 1002 B-N for execution.

In some embodiments, instead of a master BIOS, an overseer software object 1010 may be created that may regulate coordination and context switching among peripherals A-N. As an example, the overseer software object 1010 may reside low in memory (e.g. 0x20000). At boot up, the bootloader code would find memory block 0x20000 along with other memory blocks containing initialization code. However, instead of turning control over to the peripheral start-up code in a master BIOS, as discussed above in regard to FIG. 2A, control would be passed to the overseer software object 1010 which may be configured with a suitable set of interrupt vector addresses that allows the overseer software object 1010 to then control the commands, task calls and feedback between each BIOS 1002 A-N and it associated peripheral application 1000 A-N. For example, the overseer software object 1010 may run a command foreground task loop that calls the actual foreground tasks of each particular BIOS 1002 A-N when required.

To implement the software architecture of FIG. 2B, the memory of processor 100 requires proper partitioning, one partition per hardware peripheral. The following discussion of partitioning is simplified and merely exemplary. After having read the disclosure herein, one of ordinary skill in the art will appreciate that the partitioning of the processor may be accomplished in a practically infinite number of variations without departing from the scope of this disclosure. Further, the specific memory addresses used herein are also merely exemplary. Any implied reference to a particular memory address block or to a particular memory device depicted in FIG. 1 or elsewhere may be merely coincidental and is not intended to be limiting in any fashion.

Figure 3:
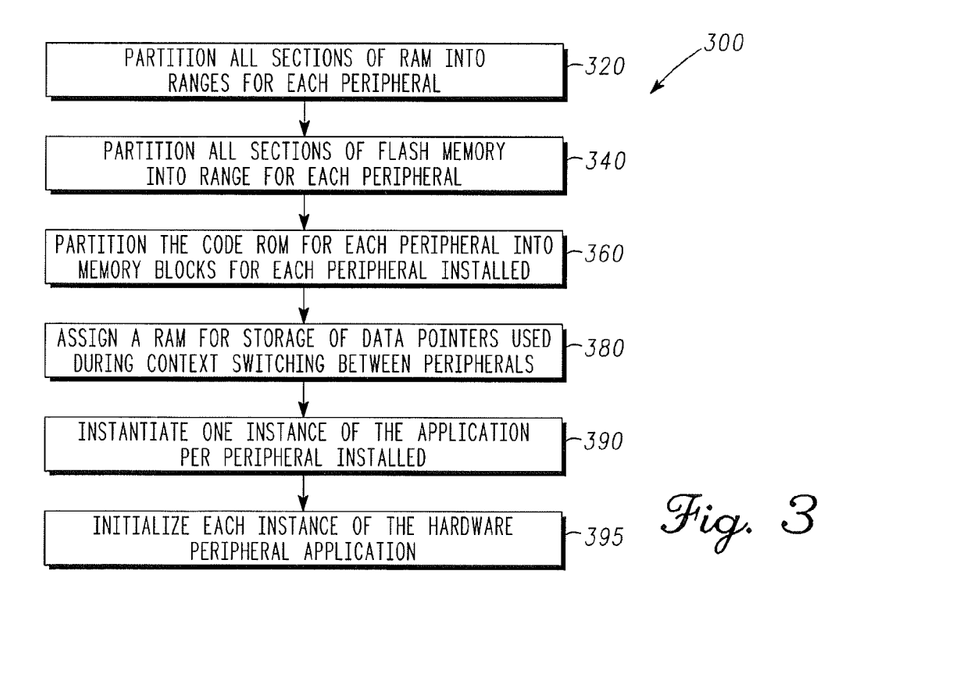
FIG. 3 is a flow chart of an exemplary method to configure a processor to operate two or more peripheral devices.

FIG. 3 is a simplified, exemplary flowchart for configuring a processor memory to operate two peripheral devices A and B. However, any number of hardware peripherals may be controlled in the same manner. One of ordinary skill in the art will appreciate that the following method may be broken down into component steps, steps may be combined, or their order rearrange without departing from the scope of the disclosure presented herein. One of ordinary skill in the art will also appreciate that the memory addresses indicated in FIG. 3 are merely exemplary and that specific data may be stored at any memory address in any particular memory device or may be disbursed between various memory device combinations.

The types of memory devices mentioned herein are also exemplary. Any suitable memory device or type of memory device may be used within processor 100 to satisfy any particular purpose as may be known in the art. Non-limiting examples of such memory devices include random access memory (RAM), non-volatile RAM (NV RAM), read only memory (ROM), programmable ROM (PROM), electronically erasable PROM (EEPROM), static RAM (SRAM), flash memory, and the like.

At process 320, all sections of RAM in the instruction memory 180 and the data memory 130 of the processor 100 may be partitioned into ranges, one range(s) associated with each installed hardware peripheral A-N. Table 1, presents an exemplary partitioning in regard to an exemplary embodiment associating only two hardware peripherals A and B. The ranges are absolute and known at compile time.

TABLE 1

Exemplary RAM Partitioning

|  | 0000-3FFF | 4000-7FFF | 8000-BFFF | C000-FFFF |
|---|---|---|---|---|
| 0x4000xxxx | NV RAM A | NV RAM B | RAM A | RAM A |
| 0x4001xxxx | RAM A | RAM A | RAM A | RAM A |

TABLE 1-continued

Exemplary RAM Partitioning

|  | 0000-3FFF | 4000-7FFF | 8000-BFFF | C000-FFFF |
|---|---|---|---|---|
| 0x4002xxxx | RAM B | RAM B | RAM B | RAM B |
| 0x4003xxxx | RAM B | RAM B | NoCache A | NoCache B |

In some embodiments, partition (e.g. 0x40000000 to 0x40007FFF) may be reserved for non-volatile RAM (NV RAM) and may be battery driven. However, in other embodiments, the partition may be volatile RAM.

At process 340, all sections of any flash registries of the processor 100 may be partitioned into ranges for each hardware peripheral A and B, one range for each installed hardware peripheral A and B. One of skill in the art will appreciate that the use of flash registries for the partitions discussed herein is merely exemplary. Other storage devices may be used including but not being limited to magnetic disk drives.

Table 2, presents an exemplary partitioning of the memory in regard to hardware peripherals A and B indicating exemplary BIOS functions that may be stored therein. The ranges are absolute and known at compile time.

TABLE 2

Exemplary Flash Memory Partitioning

| 0x00100000 | Code ROM A |
| 0x00180000 | Calibration ROM A |
| 0x00200000 | Calibration ROM A |
| 0x00280000 | Code ROM B |
| 0x00300000 | Calibration ROM B |
| 0x00380000 | Calibration ROM B |

Before proceeding further, it is to be noted that a Code ROM may be a memory location in which an executable instruction mat be accessed directly. In some embodiments, the Code ROM may contain an instance of a peripheral application 1000 A-N and/or its related BIOS 1002 A-N. Calibration ROM may be a memory location in which data or other information that is not executable code is stored, such as calibration data. Calibration data are data specific to a particular peripheral, such as a motor, actuator or other hardware device/system.

Some embodiments may include the overseer software object 1010 (See FIG. 2B) that may comprises a vector table that coordinates some basic functions between the BIOS 1002A for the peripheral application 1000A and the BIOS 1002 B-N for the peripheral application instances 1000 (B-N). The overseer object is not a BIOS in these embodiments, per se, because it is not directly associated with a particular peripheral. However, because the overseer object 1010 may provide control to multiple peripherals A-N, the overseer object may reside in low memory (e.g. 0x20000) as it may be preferred to run the overseer during boot up.

In other embodiments, the functionality of the overseer software object 1010 may be integrated into the Code ROM of one of the hardware peripherals A-B (e.g. peripheral A). As such, the overseer object functionally transforms one of the peripheral BIOSs 1002A into a master BIOS that interacts with the other BIOSs 1002 B-N associated with the other instances of the peripheral applications 1000 B-N. Such transformation may be accomplished by creating a dummy code module 1004 in the master BIOS 1002A that may be configured to generate known entry point addresses in other blocks of BIOS instances 1002 B-N.

In embodiments utilizing a master BIOS, Table 2 may not include the Code ROM block and the Calibration ROM block for the master BIOS 1002A as they may be linked into the peripheral application 1000A associated with the master BIOS A. A peripheral application 1000 and its associated BIOS 1002 may be linked by building them together into a single module during the build process by a linker (not shown). This may be accomplished by forcing the non-master BIOS (i.e. 1002B) function entry addresses to known locations in the memory ranges containing the called functions. A dummy code module 1004 that contains only addresses for the non-master bios functions but no executable code is then linked into the master BIOS 1002A. An advantage of linking is that all calls are direct and faster than using a jump table 1001, although a jump table 1001 may still be used.

Returning now to the description of method 300; in process 360, the Code ROM A and Code ROM B are further partitioned into blocks of memory. These addresses are absolute and known at compile time.

Table 3A presents a partition used in some embodiments assuming that an overseer software object 1010 exists. As such, the bases of both the Code ROM A and Code ROM B may be partitioned further.

TABLE 3A

Exemplary Code ROM A and Code ROM B partition blocks

| | |
|---|---|
| 0x00100000 | Motor A initialization |
| 0x00100400 | Peripheral A Interrupt handler 1 |
| 0x00100800 | Peripheral A Interrupt handler 2 |
| 0x00100C00 | Peripheral A Interrupt handler 3 |
| 0x00101000 | Peripheral A Interrupt handler 4 |
| 0x00101400 | Peripheral B foreground task |
| 0x00280000 | Peripheral B initialization |
| 0x00280400 | Peripheral B Interrupt handler 1 |
| 0x00280800 | Peripheral B Interrupt handler 2 |
| 0x00280C00 | Peripheral B Interrupt handler 3 |
| 0x00201000 | Peripheral B Interrupt handler 4 |
| 0x00281400 | Peripheral B foreground task |

In those Embodiments where the overseer software objet 1010 does not exist per se, but its functionality is instead integrated into a master BIOS 1002, the Code ROM of the master BIOS (e.g. peripheral A) would not need to be partitioned further to provide known entry point addresses for functions called by a master BIOS as describe above. Assuming that the BIOS 1002A is the master BIOS, only the addresses for the base of Code ROM B would be further partitioned into memory blocks, as depicted in Table 3B below.

TABLE 3B

Exemplary Code ROM B partition blocks with no overseer software object.

| | |
|---|---|
| 0x00280000 | Peripheral B initialization |
| 0x00280400 | Peripheral B Interrupt handler 1 |

TABLE 3B-continued

Exemplary Code ROM B partition blocks with no overseer software object.

| | |
|---|---|
| 0x00280800 | Peripheral B Interrupt handler 2 |
| 0x00280C00 | Peripheral B Interrupt handler 3 |
| 0x00281000 | Peripheral B Interrupt handler 4 |
| 0x00281400 | Peripheral B foreground task |

At process 380, a section of RAM in instruction memory 180 is reserved for storage for data pointers that may be used during context switching between hardware peripherals A and B. A data pointer is a programming language data object whose value refers directly to (or "points to") another value stored elsewhere in the computer memory using its address.

For high-level programming languages such as peripheral application 1000, pointers occupy a block of available memory and effectively take the place of general purpose registers that are used in low level languages such as assembly language or machine code. The use of data pointers is well known in the art. Therefore any further description concerning the operation of data pointers will be omitted herein in the interest of brevity and clarity.

In this exemplary embodiment, this data pointer is reserved in the exemplary NV RAM B section of Table 1, as presented below in Table 4.

TABLE 4

Data Pointer Storage

| | |
|---|---|
| 0x40007FF0 | r2a |
| 0x40007FF4 | r13a |
| 0x40007FF8 | r2b |
| 0x40007FFC | r13b |

In Table 4, address 0x40007FF0 (i.e. r2a) may be storage for a register that points to the small code space (i.e. initialization constants) for the peripheral application 1000A and address 0x40007FF4 (i.e. r13a) may be storage for a register that points to the small data space for the peripheral application 1000A. Addresses 0x40007FF8 and 0x40007FFC would store the same pointer registers for hardware peripheral B. The addresses of this section are absolute and known at compile time.

At process 390, one instance of the peripheral application 1000 is duplicated for each hardware peripheral A-N being controlled. For example, if three electric motors are to be controlled, three copies of the peripheral application 1000 would be loaded into the instruction memory 180 and run by the processor 100. Processes 320-390 may be performed during a code design and build operation or they could be performed dynamically by the execution of the system code of the processor 100 during boot up or initialization. Process 395 occurs during application code execution as described more fully below.

Figure 4A:
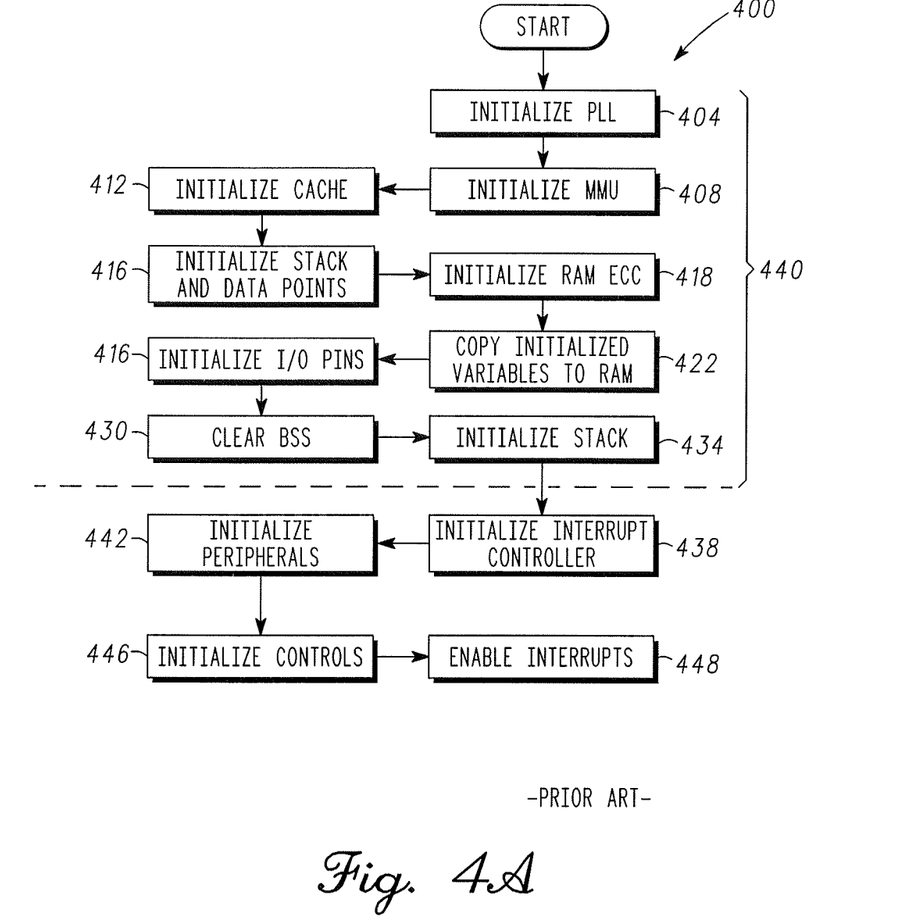
FIG. 4A is a flow chart of a conventional method to initialize a hardware peripheral application.

FIG. 4A is a flowchart illustrating exemplary initialization process 400 of a peripheral application 1000 as may be known in the art. The processes 404-438 are standard initialization processes and are being identified herein as a reference for clarity. These processes will hereinafter be referred to in the aggregate as the "Single Peripheral Initialization Procedure" 440 for brevity.

At process 404 a phased locked loop (PLL) is initialized as may be know in the art. The LCU 160 typically includes a low frequency crystal oscillator. The low frequency oscillator is multiplied by the PLL to produce the operating frequency of processor 100.

At process 408, a memory management unit (MMU) may be initialized as may be known in the art. At process 412, the memory cach(es) (130, 180, 150) may be initialized as may be known in the art. At process 416, any data pointers are initialized as may be known in the art.

At process 418 a RAM Error Correction Code (ECC) is initialized as may be known in the art. The error-correcting code is an algorithm for expressing a sequence of numbers such that any errors which are introduced can be detected and corrected based on the remaining numbers.

At process 422, any initialized variables created during the build and compile process are copied to RAM. At process 426, any pertinent input/output pins are initialized as may be known in the art.

At process 430, the BSS memory segment is cleared. The BSS memory segment is used by many compilers as the name of a part of the data segment containing static variables and global variables that are initialized solely with zero-valued data initially. It is often referred to as the "bss section" or "bss segment". A program loader initializes the memory allocated for the BSS section when it loads the program.

At process 434, any data stacks are initialized as may be known in the art. A stack is a last in-first out (LIFO) data structure. A stack can have any abstract data type as an element, but is characterized by only two fundamental operations: push and pop. The push operation adds to the top of the list, hiding any items already on the stack, or initializing the stack if it is empty. The pop operation removes an item from the top of the list, and returns this value to a caller.

At process 438, an interrupt controller is initialized as may be known in the art. The interrupt controller provides the means by which I/O devices request attention from the processor to deal with data transfers or to trigger a change in processor's processing activity. At process 442, the hardware peripherals (A-B) are initialized as may be known in the art.

At process 446, peripheral application controls are initialized over the peripheral A within the BIOS 1002A as may be known in the art. At process 448, any interrupts are enabled. In some embodiments the peripheral application 1000 may initialize itself. However, in other embodiments the peripheral application does not initialize itself because all control algorithms are run in the background inside interrupt service routines (ISR)(See, below). It is typically preferred that peripheral application initialization be accomplished before interrupts are enabled.

Figure 4B:
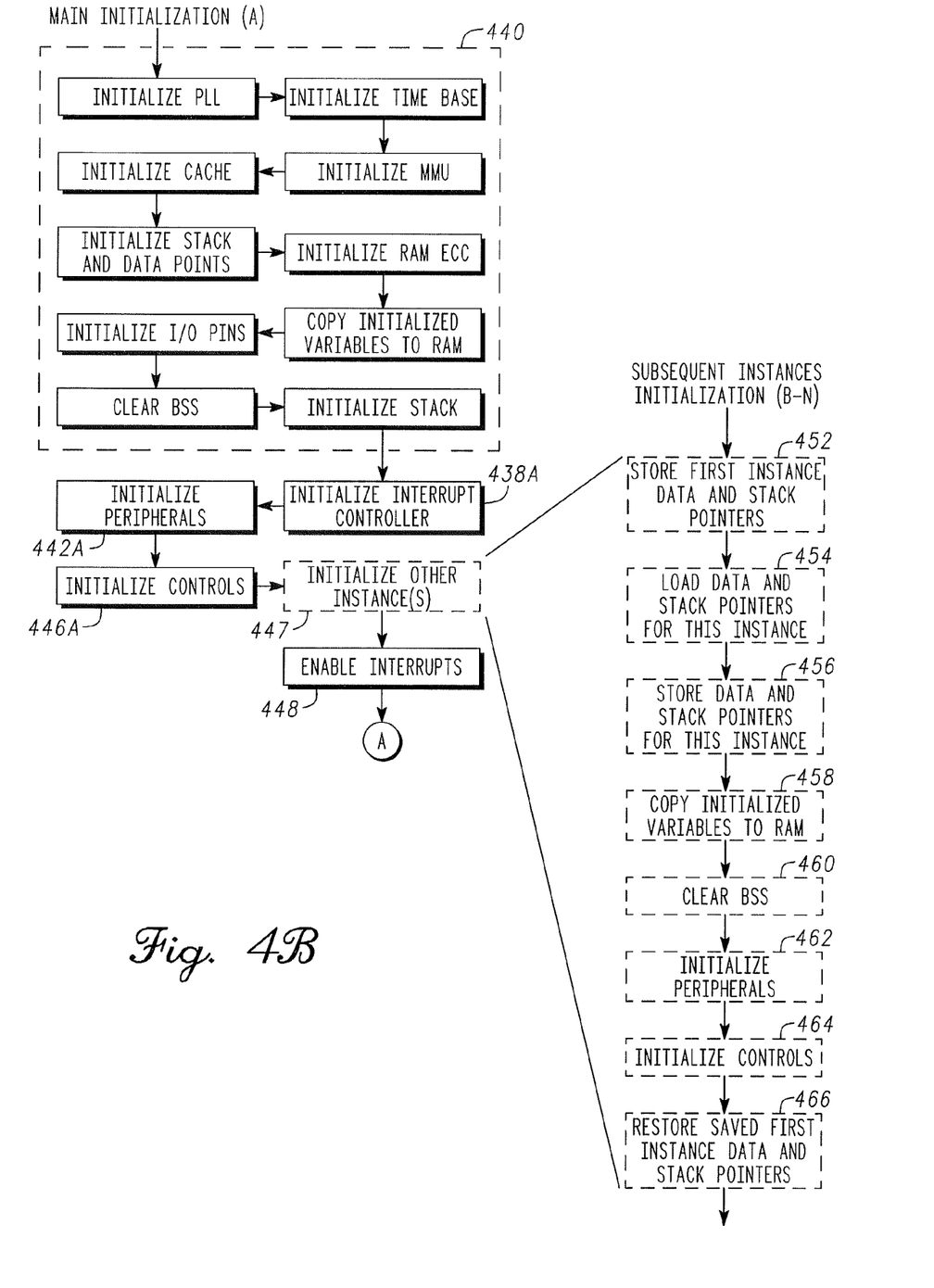
FIG. 4B is a flowchart of an exemplary method to initialize a hardware peripheral application.

FIG. 4B is a simplified, exemplary flow chart for initializing a processor to operate two or more peripheral devices A and B. At single peripheral initialization procedure, the processor is initialized according to the exemplary Single Peripheral Initialization Procedure discussed above in regard to FIG. 4A.

At process 438A, an interrupt controller associated with each instance of the peripheral application 1000 A-N may be initialized together or in quick succession. In other embodiments, the interrupt controllers may be initialized one at a time as each BIOS 1002 B-N is called by a master BIOS 1002A or by the overseer software object 1010.

At process 442A, each of the peripherals A-N may be initialized together or in quick succession. In other embodiments each peripheral B-N may be one at a time as each BIOS 1002 B-N is called by a master BIOS 1002A or by the overseer software object 1010.

At process 446A, the master peripheral application 1000A is initialized as may be known in the art. It should be noted at this point that in embodiments without an overseer software object 1010, one of the instances of the BIOS 1002 A-N will include some of the functionality of the overseer software object 1010 incorporated in it thereby making that BIOS instance the "master BIOS". The master BIOS is initialized first.

In embodiments in which the functionality of the overseer software object 1010 is integrated into the master BIOS (e.g. BIOS 1002A), an additional initialization process 447 is added to the end of the Single Peripheral Initialization Procedure 440, which calls a subroutine (452-466) that initializes each of any additional peripheral BIOSs B-N that are to be initialized. At process 447, the initialization routine initializes the other instances of the peripheral application 1000B-N in a serial fashion beginning at process 452. Process 447 comprises processes 452-446 is a component of the BIOS extension 1005.

At process, 452 the master peripheral instance 1000A data pointers, which were initialized at process 416, are stored in the data blocks (r2a/r13a) that have been reserved for data pointers as discussed above in regard to Table 4 above. Because this step is applicable only to the master instance 1000A, this step may be executed only once.

At process 454, the initial data and stack pointer values for a subsequent peripheral application 1000B are loaded as immediate values supplied by a link editor (not shown) during the program compiling process. At process 456, the data and stack pointer values are stored to the data blocks reserved for pointers (i.e. r2b/r13b).

Processes 454-464 are similar initialization steps to those for the master BIOS 1001A but instead initialize a first subsequent instance of the BIOS. At process, 466, the master instance data pointers and stack pointers are restored and the method proceeds to process 448 where the BIOS interrupts are enabled. One of ordinary skill in the art will appreciate that if additional subsequent application instances exist then the process will proceed from process 466 of the first subsequent initialization to a second subsequent application initialization at process 454. The process will be repeated until all subsequent instances of the application are initialized.

In embodiments where the overseer software object 1010 is utilized, the method presented in FIG. 4B remains the same except that processes 438A and 442A may be combined into one step. In the combined processes 438A/442A, the overseer software object 1010 may call the hardware application to initialize all the peripheral BIOSs 1002A-N utilizing the subroutine disclosed using BIOS extension processes 452-446.

Figure 5:
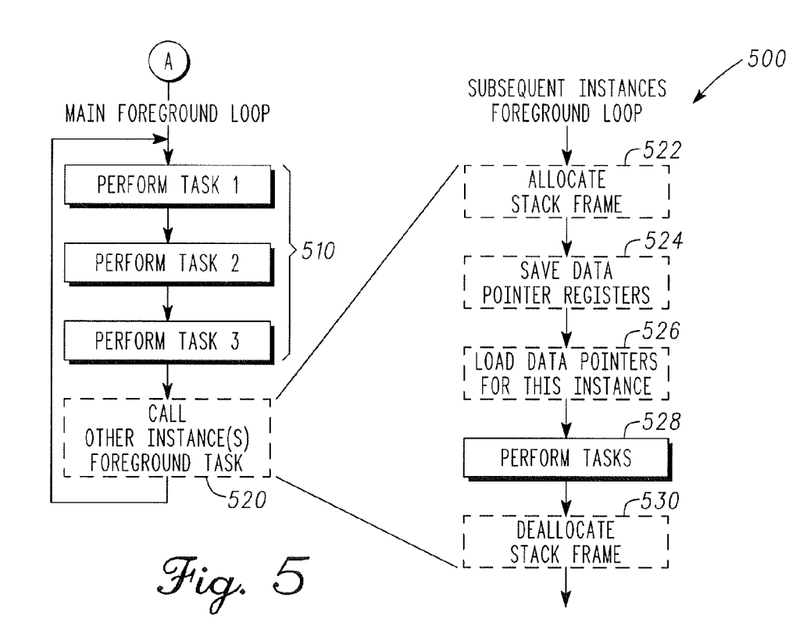
FIG. 5 is a flow chart of an exemplary foreground loop configured to operate multiple peripheral application.

FIG. 5 is a flowchart of the logic of the main foreground task loop that is entered into by the master BIOS 1002A after the initial initialization described in regard to FIG. 4. In the prior art case, routine tasks 510 are repetitively performed. Or, if no tasks are assigned, the processor may go to sleep until an interrupt is received. However, in some embodiments an additional process 520 is used to call other instances of the foreground tasks related to the peripheral applications 1000B-N. Process 520 and is component sub-processes are BIOS extensions 1005.

At the next subsequent instance of the peripheral application 1000B, the stack frame is allocated in memory at process 522. At process 524, the data pointers from the previous instance are saved to the stack frame as part of the context. At process 526, new pointers for this BIOS B are loaded from the memory block to which they were stored in process 456. The required tasks associated with the peripheral application 1000B are performed at process 528. At the completion of the process 528, the data and stack registers from the previous register are restored at process 530 and the sub-routine returns to process 520 where all subsequent foreground instances associated with any additional peripheral application instances are completed in a like fashion.

Figure 6:
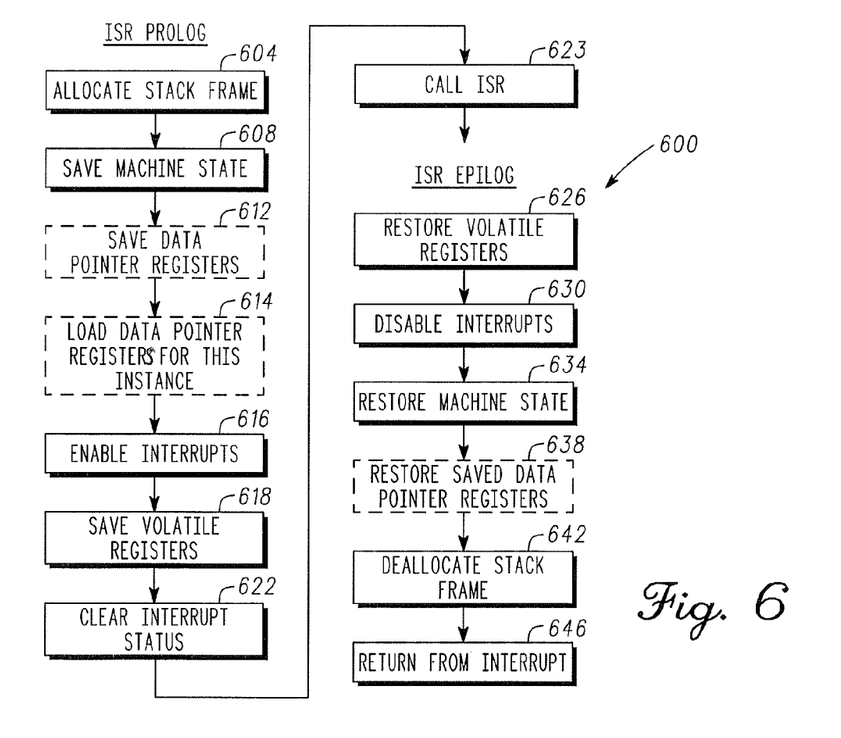
FIG. 6 is a flow chart of an exemplary interrupt service routine (ISR) configured to operate with multiple application instances.

FIG. 6 is a flow chart is a flow chart of the interrupt service routine prolog and epilogs related to any of the peripheral applications 1000 A-N as modified to accommodate multiple instances of the peripheral application 1000 A-N. An ISR is a software routine that a hardware BIOS 1001 A-N invokes in response to an interrupt. ISRs examine an interrupt and determine how to handle it. ISRs handle the interrupt, and then return a logical interrupt value. An ISR should perform very fast to avoid slowing down the operation of the device and the operation of all lower priority ISRs. An ISR prolog is the first code that runs in an interrupt handler (not shown). The prolog performs all of the low level operations required to save the current machine state (i.e. context), re-enable interrupts and clear the hardware interrupt status. Similarly an epilog is the last code that runs in the interrupt handler. The epilog restores the saved machine state and returns.

At process 604, space in the stack is allocated to save machine state data and in process 608, that data is saved to the stack. At process 612, the data pointers are saved to the stack frame as part of the context. At process 614, the data and stack pointers for the peripheral application instance associated with this interrupt are loaded. At process 616, further interrupts are enabled and any volatile registers are saved at process 618. At process 622 interrupt status is cleared for this associated interrupt and the ISR is called at process 623. Processes 612 and 614 are BIOS extensions 1005.

After the ISR is executed, the volatile registers stored at process 618 are restored at process 626 and interrupts are disabled at process 630. At process 608 the machine state stored during process 608 is restored. At process 638, the data registers are stored at process 612 are restored. The stack frame is then deallocated at process 642 and the control of the program is returned from the interrupt back to the point of interruption. Process 638 is a BIOS extension 1005.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for configuring a processor to operate a plurality of peripheral devices without altering a peripheral application designed to drive a single peripheral device, comprising:
   duplicating one instance of the peripheral application and an associated basic input/output system (BIOS) for each peripheral device of the plurality;
   partitioning a memory device into ranges comprising one or more blocks of memory, one range being associated with each instance of the peripheral application and its associated BIOS;
   reserving an additional range of memory for storage of data pointers, each data pointer associated with one peripheral device and BIOS of the plurality, the data pointers being configured for context switching between the plurality of peripheral devices; and
   initializing each peripheral application and associated BIOS of the plurality.

2. The method of claim 1, wherein each of the one or more blocks of memory associated with each instance of the peripheral application comprises an entry point address for a particular BIOS function of each BIOS associated with one of the peripheral devices of the plurality.

3. The method of claim 1, wherein each BIOS related to each peripheral device of the plurality are linked together via common operating data located at known memory addresses located in the one or more blocks of memory.

4. The method of claim 1, wherein the step of partitioning further comprises:
   partitioning a volatile memory into ranges associated with one peripheral device of the plurality; and
   partitioning a non-volatile memory into ranges associated with one peripheral device of the plurality.

5. The method of claim 4, wherein addresses of the ranges of the volatile memory and the ranges of the non-volatile memory are absolute and known at a compile time.

6. The method of claim 4, wherein each range of memory addresses for storage of a data pointer related to each peripheral device of the plurality is part of the volatile memory and is absolute and known at a compile time.

7. The method of claim 1, wherein the step of initializing each of the plurality of peripheral devices further comprises:
   loading and storing the data pointers related to each peripheral device of the plurality into the range of memory addresses for storage of a data pointer; and
   initializing one or more control features of the peripheral application associated with each peripheral device of the plurality.

8. The method of claim 7, further comprising an overseer software object configured to initialize and control all duplicate instances of the peripheral application.

9. The method of claim 8, further comprising:
   storing data pointers utilized in a previous initialization of one of the peripheral devices of the plurality prior to the step of loading and storing the data pointers; and
   restoring the data pointers utilized in a previous initialization after the step of initializing one or more control features.

10. A logic device configured to concurrently execute a plurality of instances of a peripheral application, comprising:
    a logic control unit; and
    a memory in communication with the logic control unit, wherein the memory is partitioned into a plurality of ranges, a range being associated with each instance of the plurality of peripheral application instances and its associated basic input/output system (BIOS) and an additional range being reserved for storage of a data pointer associated with each peripheral application of the plurality and its related BIOS.

11. The logic device of claim 10, wherein the data pointers are configured for context switching between each instance of the plurality of peripheral applications.

12. The logic device of claim 11 wherein each range of memory comprises entry point addresses for one BIOS associated with each instance of the peripheral application of the plurality.

13. The logic device of claim 11, wherein each BIOS related to the plurality of instances of the peripheral application is linked to the other BIOSs of the plurality by addressing common data addresses.

14. The logic device of claim 9, wherein the logic control unit is configured to initialize each of the peripheral applications.

15. The method of claim 14, wherein initializing each of the peripheral applications of the plurality comprises:
 loading and storing the data pointers associated with each instance of the peripheral application into the range of memory reserved for storage of the data pointers; and
 initializing one or more control features for each of the peripheral application instances of the plurality.

16. The method of claim 15, wherein initializing each of the plurality of peripheral application instances is done in sequence, one peripheral application instance at a time.

17. A non-transient computer readable storage medium configured to store instructions that when executed by a computing device perform the steps comprising:
 duplicating one instance of a peripheral application and a BIOS for each peripheral device of a plurality of peripheral devices;
 duplicating a basic input/output system (BIOS) for each peripheral device of a plurality of peripheral devices;
 partitioning a memory device into ranges comprising one or more blocks of memory, one range being associated with each instance of the peripheral application;
 altering one BIOS of the plurality to be a master BIOS by creating a dummy code in the master BIOS, the dummy code being configured to generate known entry point addresses in non-master BIOS blocks;
 reserving a range of memory addresses for storage of a data pointer related to each peripheral device of the plurality, the data pointer configured for context switching between the plurality of peripheral devices; and
 initializing each of the plurality of peripheral devices.

18. The non-transient computer readable storage medium of claim 17, wherein the step of partitioning further comprises:
 partitioning a volatile memory into at least one range of addresses for each peripheral of the plurality; and
 partitioning a non-volatile memory into at least one range of addresses for each peripheral of the plurality.

19. The non-transient computer readable storage medium of claim 18, wherein the addresses for the ranges of the volatile memory and for the ranges of the non-volatile memory are absolute and known at a compile time.

20. The non-transient computer readable storage medium of claim 19, wherein the range of memory addresses for storage of a data pointer related to each peripheral of the plurality is part of the volatile memory and is absolute and known at a compile time.

* * * * *